United States Patent
Huang

[11] Patent Number: 6,161,909
[45] Date of Patent: Dec. 19, 2000

[54] COMPUTER MAINFRAME CASE AND SIDE COVER ARRANGEMENT

[75] Inventor: Meng Chou Huang, Taipei, Taiwan

[73] Assignee: First International Computer, Inc., Taipei, Taiwan

[21] Appl. No.: 09/383,357

[22] Filed: Aug. 26, 1999

[51] Int. Cl.[7] .............................. A47B 81/00; E05C 7/06
[52] U.S. Cl. ................ 312/223.2; 312/222; 312/265.6; 292/175
[58] Field of Search ................. 312/223.1, 222, 312/223.2, 263, 265.5, 265.6, 326, 327, 328, 329, 293.1, 293.2, 293.3, 348.2; 292/175, DIG. 63; 361/683, 679, 724

[56] References Cited

U.S. PATENT DOCUMENTS

| | | | |
|---|---|---|---|
| 4,320,834 | 3/1982 | Tamaki | 292/175 X |
| 4,790,579 | 12/1988 | Maxwell et al. | 292/175 |
| 4,909,579 | 3/1990 | Liu | 312/223.2 |
| 5,062,671 | 11/1991 | Goetz et al. | 292/175 |
| 5,193,707 | 3/1993 | Mizumura | 292/175 X |
| 5,711,587 | 1/1998 | Takahashi et al. | 312/265.6 |
| 5,823,646 | 10/1998 | Arizpe et al. | 312/223.1 X |
| 5,825,626 | 10/1998 | Hulick et al. | 3112/223.2 X |
| 5,963,422 | 10/1999 | Golobay et al. | 312/328 X |
| 5,967,633 | 10/1999 | Jung | 312/223.2 |
| 5,997,115 | 12/1999 | Radloff et al. | 312/223.2 X |
| 6,015,195 | 1/2000 | Anderson et al. | 312/223.2 |

*Primary Examiner*—Peter M. Cuomo
*Assistant Examiner*—Hanh V. Tran
*Attorney, Agent, or Firm*—Rosenberg, Klein & Lee

[57] ABSTRACT

A computer mainframe case and side cover arrangement, which includes a computer mainframe case having a back opening and two coupling holes respectively provided at two opposite upright side walls thereof near the back opening, a side cover coupled to the computer mainframe case and closed on the back opening, the side cover having a top flange and a bottom flange perpendicularly backwardly raised from top and bottom sides thereof, and two coupling lugs respectively formed integral with two distal ends of the top flange and respectively coupled to the coupling holes at the computer mainframe case for enabling the side cover to be turned between a close position where the side cover is closed on the back opening of the computer mainframe case with the bottom flange thereof stopped at the bottom wall of the computer mainframe case, and an open position where the side cover is maintained in horizontal and supported on the upright side walls of the computer mainframe, and retaining devices respectively fastened to the side cover to hold down the side cover in the close position.

4 Claims, 5 Drawing Sheets

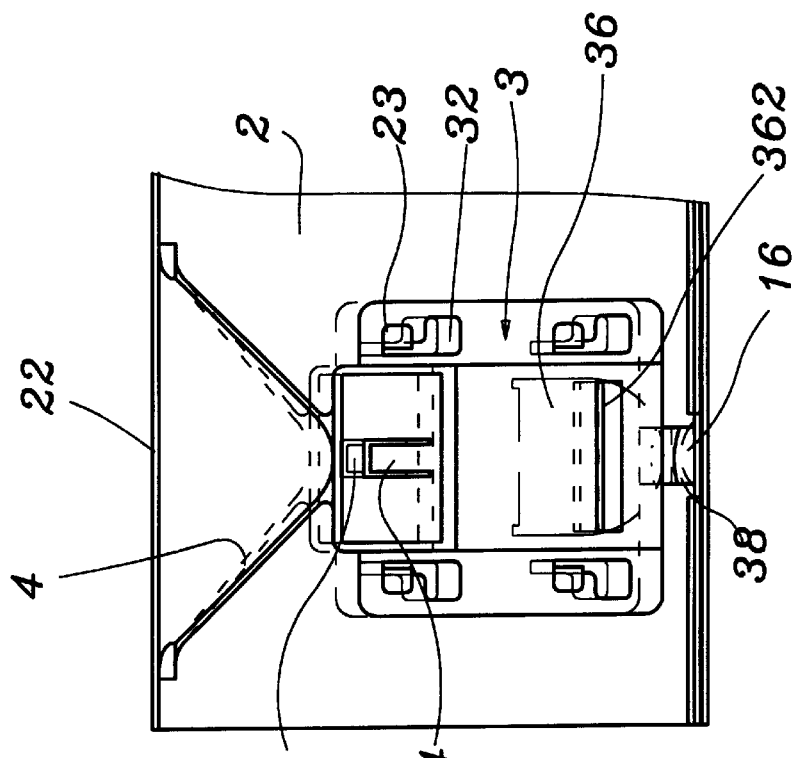
FIG. 4
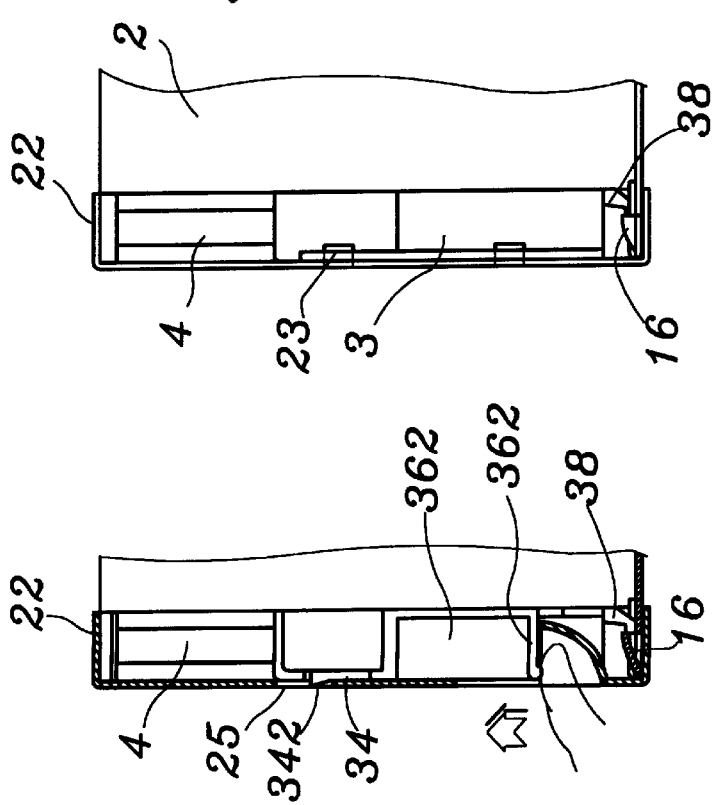
FIG. 5
FIG. 6

COMPUTER MAINFRAME CASE AND SIDE COVER ARRANGEMENT

BACKGROUND OF THE INVENTION

The present invention relates to a computer mainframe case and side cover arrangement, and more particularly to such an arrangement, in which the side cover can be turned between an open position and a close position.

FIG. 1 shows a computer mainframe case and side cover arrangement according to the prior art. According to this arrangement, the computer mainframe case 1 has a back opening, and the side cover 2 is closed on the back opening and fixedly fastened to the computer mainframe case 1 by screws 12. Because the side cover 2 is fixed to the computer mainframe case 1 by screws 12, it is difficult to open the side cover 2, and a screwdriver must be used when opening the side cover 2. When opening the side cover 2, the screws 12 may fall to the ground.

SUMMARY OF THE INVENTION

It is one object of the present invention to provide a computer mainframe and side cover arrangement, which enables the side cover to be turned between the close position and the open position. It is another object of the present invention to provide a computer mainframe and side cover arrangement, which enables the user to conveniently open the side cover without the use of any hand tool. According to one aspect of the present invention, the computer mainframe and side cover arrangement comprises a computer mainframe case having a back opening and two coupling holes respectively provided at two opposite upright side walls thereof near the back opening, and a side cover coupled to the computer mainframe case and closed on the back opening, the side cover having a top flange and a bottom flange perpendicularly backwardly raised from top and bottom sides thereof, and two coupling lugs respectively formed integral with two distal ends of the top flange and respectively coupled to the coupling holes at the computer mainframe case for enabling the side cover to be turned between a close position where the side cover is closed on the back opening of the computer mainframe case with the bottom flange thereof stopped at the bottom wall of the computer mainframe case, and an open position where the side cover is maintained in horizontal and supported on the upright side walls of the computer mainframe. According to another aspect of the present invention, at least one retaining device is fastened to the side cover to hold down the side cover in the close position.

BRIEF DESCRIPTION OF THE DRAWINGS

FIG. 4 is a schematic front view showing the movement of the retaining device relative to the side cover at the computer mainframe case according to the present invention.

FIG. 5 is a side view of FIG. 4.

FIG. 6 is similar to FIG. 5 but showing the retaining device lifted.

DETAILED DESCRIPTION OF THE PREFERRED EMBODIMENT

Figure 1:
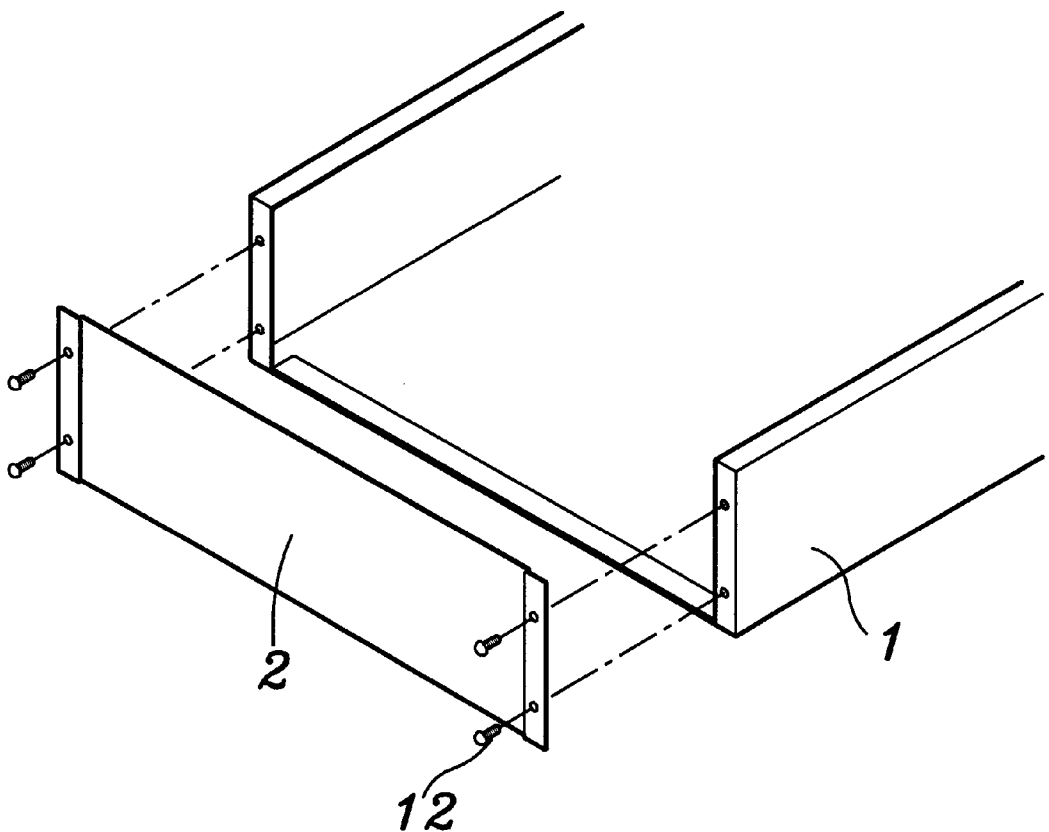
FIG. 1 shows a computer mainframe case and side cover arrangement according to the prior art.
Figure 2:
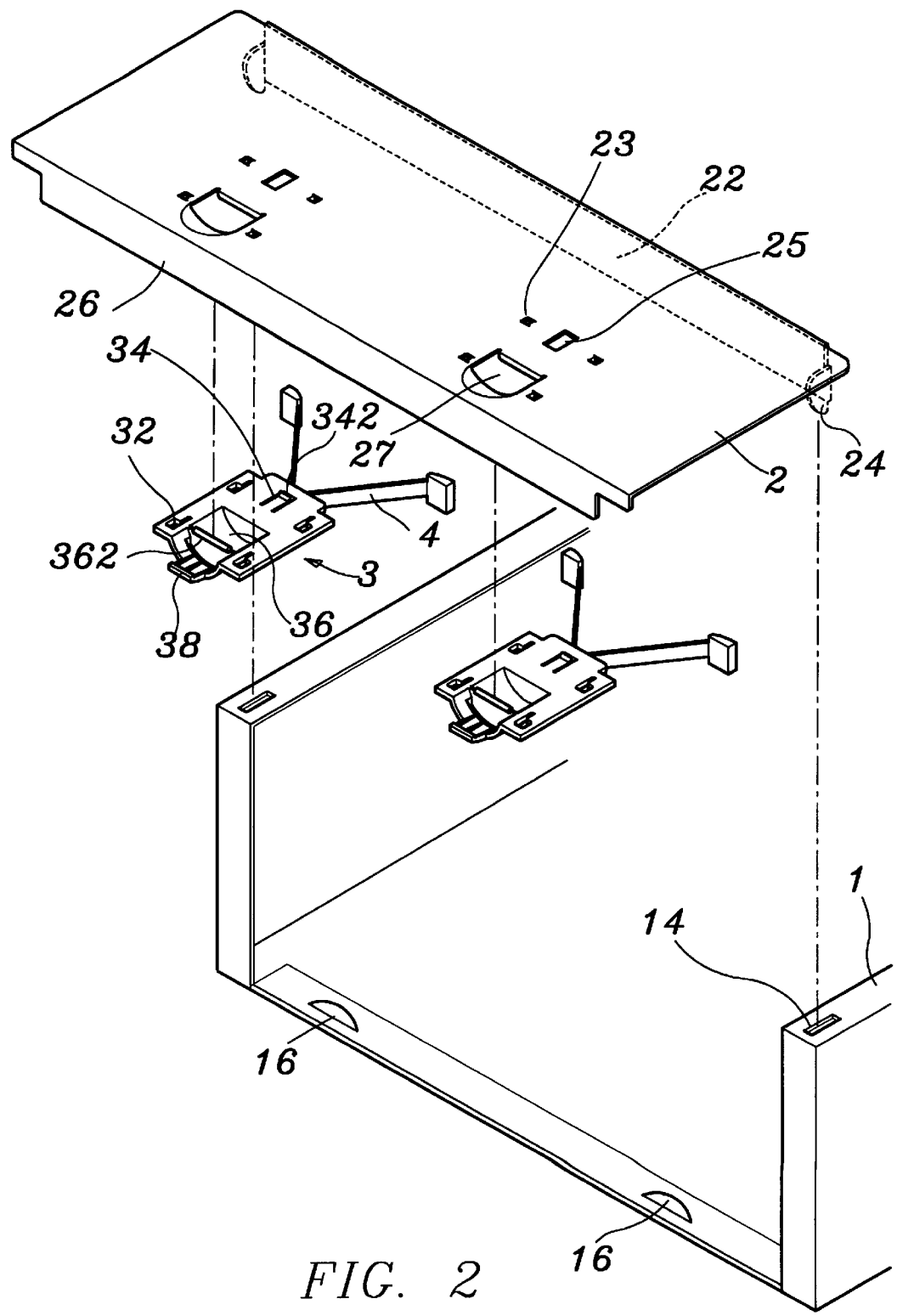
FIG. 2 is an exploded view of the present invention.
Figure 3:
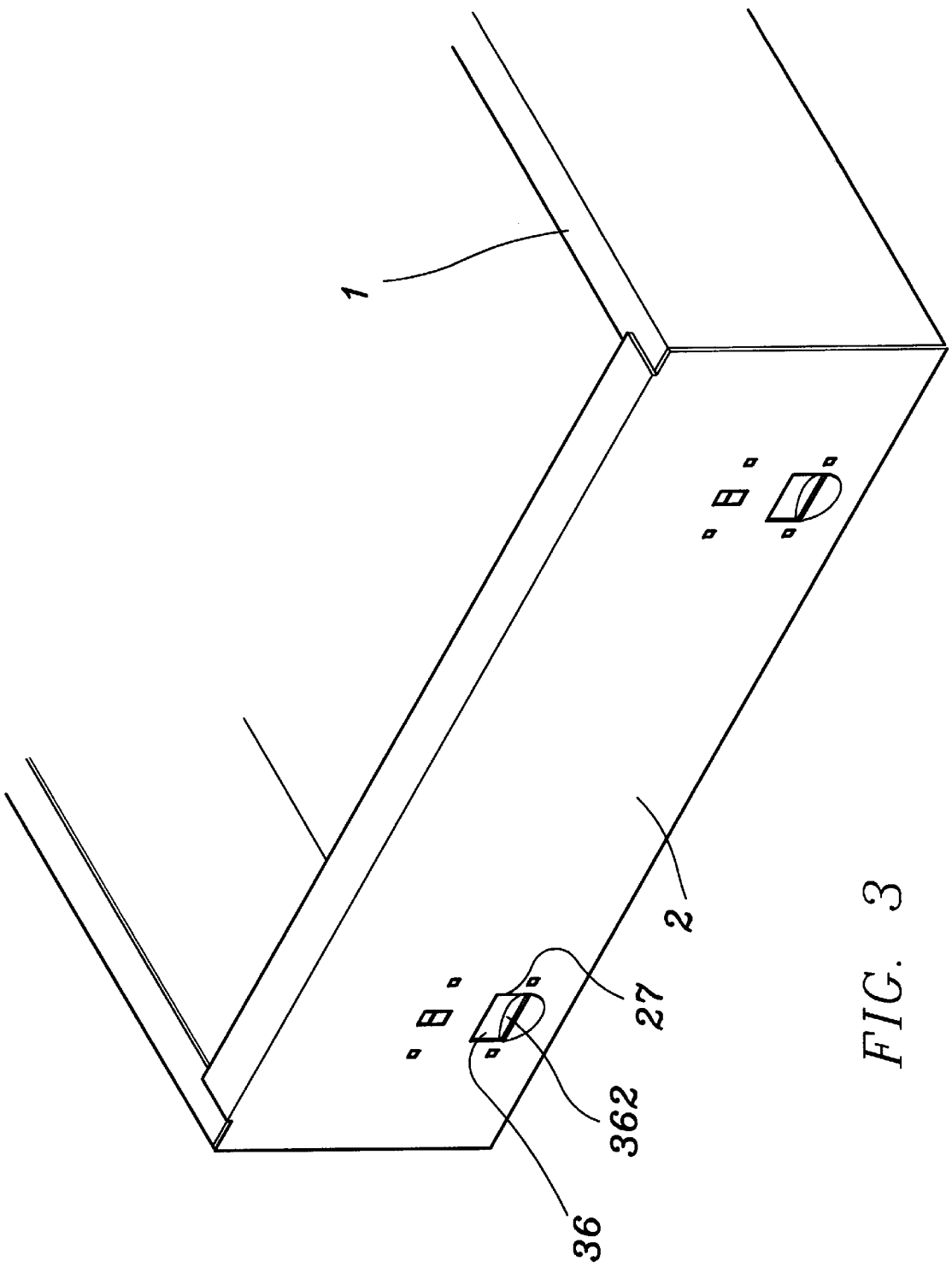
FIG. 3 shows the side cover fastened to the computer mainframe case and closed on the back open side of the computer mainframe case.
Figure 7:
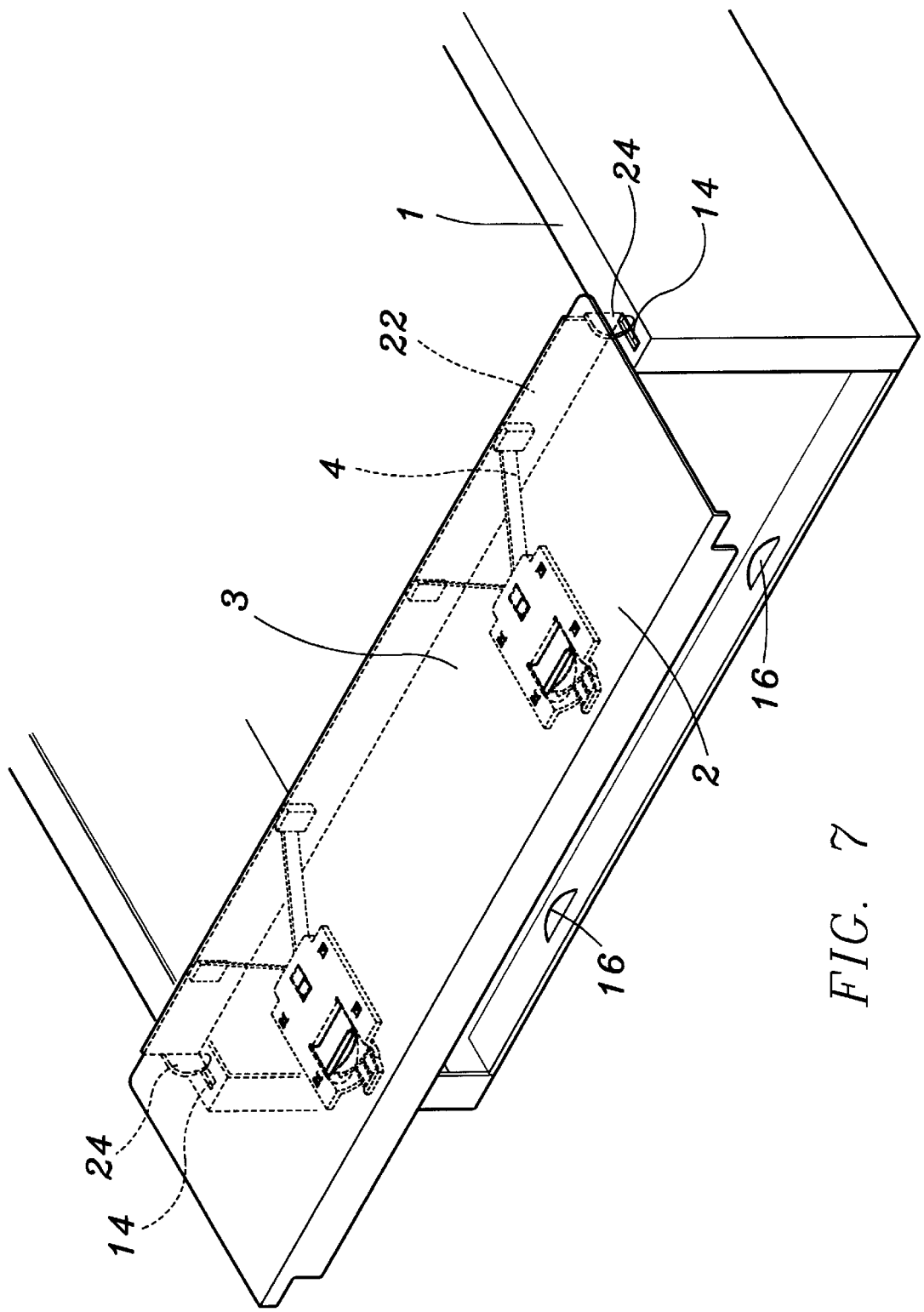
FIG. 7 is a perspective view of the present invention, showing the side cover opened.

Referring to FIGS. 2, 3 and 7, a side cover 2 is detachably covered on the back open side of a computer mainframe case 1. The side cover 2 is a flat rectangular member having a top flange 22 and a bottom flange 26 perpendicularly backwardly raised from the top and bottom sides thereof, and two coupling lugs 24 respectively formed integral with two distal ends of the top flange 22 at the bottom. The computer mainframe case 1 comprises two coupling holes 14 respectively pro vided at two opposite upright side walls thereof at the top. The side cover 2 is fastened to the computer mainframe case 1 by coupling the coupling lugs 24 of the side cover 2 to the coupling holes 14 at the computer mainframe case 1 respectively. After installation, the side cover 2 can be turned with the coupling lugs 24 in the coupling holes 14 about an axis between an open position wherein the side cover 2 is maintained in horizontal and supported on the two upright side walls of the computer mainframe case 1 (see FIG. 7), and a closed position where the side cover 2 is closed on the back open side of the computer mainframe case 1 with its bottom flange 26 stopped at the bottom wall of the computer mainframe case 1 (see FIG. 3).

Referring to FIGS. 4 and 5 and FIGS. 2 and 3 again, two retaining devices 3 are fastened to the side cover 2 to hold down the side cover 2 in the close position. The retaining devices 3 each comprise a V-shaped spring 4 upwardly raised from the top side thereof, a downward stop flange 38 downwardly extended from the bottom side thereof, two symmetrical pairs of coupling holes 32 bilaterally disposed between the V-shaped spring 4 and the downward stop flange 38 at different elevations, a recessed portion 36 disposed on the middle between the V-shaped spring 4 and the downward stop flange 38, a finger strip 362 transversely suspended in the recessed portion 36, and a protruding springy strip 34 suspended between the recessed portion 36 and the V-shaped spring 4 and terminating in a hooked portion 342. The side cover 2 comprises two integrated coupling units for matching with the retaining devices 3 respectively, each comprising a guide slot 25 corresponding to the protruding springy strip 34 at the corresponding retaining device 3, an opening 27 disposed below the guide slot 25 corresponding to the recessed hole 36 at the corresponding retaining device 3, and two symmetrical pairs of L-shaped lugs 23 raised from the back side wall thereof corresponding to the two symmetrical pairs of coupling holes 32 at the corresponding retaining device 3. When installed, the coupling holes 32 of each retaining device 3 are respectively coupled to the corresponding L-shaped lugs 23 at the side cover 2, enabling the respective retaining device 3 to be moved vertically up and down relative to the side cover 2, the V-shaped spring 4 is stopped at the top flange 22 of the side cover 2 to impart a downward pressure to the respective retaining device 3, causing the coupling holes 32 to be firmly retained coupled to the respective L-shaped lugs 23, the hooked portion 342 of the protruding springy strip 34 is hooked in the corresponding guide slot 25 at the side cover 2 to guide vertical movement of the respective retaining device 3 relative to the side cover 2 within a limited range, and the downward stop flange 38 is stopped at the bottom wall of the computer mainframe case 1 behind a respective raised portion 16 at the bottom wall of the computer mainframe case 1.

Referring to FIG. 6 and FIGS. 3 and 7 again, the V-shaped spring 4 of each retaining device 4 is stopped at the top flange 22 of the side cover 2 to impart a downward pressure to the respective retaining device 3, thereby causing the downward stop flange 38 of the respective retaining device 4 to be stopped at the bottom wall of the computer mainframe case 1 behind the corresponding raised portion 16 at the bottom wall of the computer mainframe case 1, and therefore the side cover 2 is prohibited from being turned from the close position shown in FIG. 3 to the open position shown in FIG. 7. By inserting the fingers into one opening 27 at the side cover 2 to hold the finger strip 362 at the corresponding retaining device 4, the corresponding retaining device 4 can be lifted to compress the respective V-shaped spring 4, and to disengage the respective downward stop flange 38 from the respective raised portion 16, enabling the side cover 2 to be turned from the close position shown in FIG. 3 to the open position shown in FIG. 7.

While only one embodiment of the present invention has been shown and described, it will be understood that various modifications and changes could be made thereunto without departing from the spirit and scope of the invention disclosed.

What the invention claimed is:

1. A computer mainframe case and side cover arrangement comprising:

a computer mainframe case having a bottom wall, two opposite upright side walls bilaterally raised from said bottom wall, a back opening, two coupling holes respectively provided at said upright side walls at a top side near said back opening, and at least one raised portion raised from said bottom wall within said back opening;

a side cover coupled to said computer mainframe case and closed on said back opening, said side cover comprising a top flange and a bottom flange perpendicularly backwardly raised from top and bottom sides thereof, at least one retaining device positioning means, and two coupling lugs respectively formed integral with two distal ends of said top flange and respectively coupled to the coupling holes at said upright side walls of said computer mainframe case for enabling said side cover to be turned between a closed position where said side cover is closed on the back opening of said computer mainframe case with the bottom flange thereof stopped at the bottom wall of said computer mainframe case, and an open position where said side cover is maintained horizontally and supported on the upright side walls of said computer mainframe case, said at least one retaining device positioning means comprising an opening and symmetrical pairs of L-shaped lugs extending from an inner surface of said side cover; and at least one retaining device respectively coupled to the at least one retaining device positioning means at said side cover to hold said side cover in said closed position, said at least one retaining device comprising a spring upwardly raised from a top side thereof and stopped at the top flange of said side cover, a downward stop flange extended from a bottom side thereof for stopping at the bottom wall of said computer mainframe case behind the at least one raised portion at the bottom wall of said computer mainframe to stop said side cover from being turned from said closed position to said open position, symmetrical pairs of coupling holes respectively coupled to the L-shaped lugs at said at lest one retaining device positioning means at said side cover, and a recessed portion aimed at the opening at said at least one retaining device positioning means for the positioning of fingers to move the corresponding retaining device upwardly from the constraint of the corresponding raised portion at the bottom wall of said computer mainframe case, for enabling said side cover to be turned from said closed position to said open position.

2. The computer mainframe case and side cover arrangement of claim 1 wherein the spring of said at least one retaining device has a V-shaped profile.

3. The computer mainframe case and side cover arrangement of claim 1 wherein said at least one retaining device further comprises a finger strip suspended in the respective recessed portion.

4. The computer mainframe case and side cover arrangement of claim 1 wherein said at least one retaining device positioning means further comprises a guide slot, and said at least one retaining device further comprises a protruding springy strip having a hooked portion hooked in the guide slot at the corresponding retaining device positioning means at said side cover to guide movement of the respective retaining device relative to said side cover.

\* \* \* \* \*